United States Patent [19]

Carter

[11] Patent Number: 5,063,321
[45] Date of Patent: Nov. 5, 1991

[54] TORSIONAL VIBRATION DRIVE

[75] Inventor: Robert E. Carter, Arlington, Mass.

[73] Assignee: Teldix GmbH, Heidelberg, Fed. Rep. of Germany

[21] Appl. No.: 573,199

[22] PCT Filed: Dec. 14, 1988

[86] PCT No.: PCT/EP88/01152
§ 371 Date: Aug. 24, 1990
§ 102(e) Date: Aug. 24, 1990

[87] PCT Pub. No.: WO89/08237
PCT Pub. Date: Sep. 8, 1989

[30] Foreign Application Priority Data
Feb. 24, 1988 [DE] Fed. Rep. of Germany ....... 3805631

[51] Int. Cl.[5] .......................... H01L 41/08; F16F 1/18
[52] U.S. Cl. .................................... 310/323; 310/328; 310/331; 356/350
[58] Field of Search ........ 310/321, 323, 328, 330–332; 356/350

[56] References Cited

U.S. PATENT DOCUMENTS

| | | | |
|---|---|---|---|
| 4,115,004 | 9/1978 | Hutchings et al. | 356/350 |
| 4,314,174 | 2/1982 | Wing et al. | 360/323 X |
| 4,349,183 | 9/1982 | Wirt et al. | 310/323 X |
| 4,436,423 | 3/1984 | Kumar et al. | 356/350 |
| 4,565,941 | 1/1986 | Ridgway et al. | 310/328 |
| 4,702,602 | 10/1987 | Grant | 356/350 |
| 4,790,657 | 12/1988 | Kozma | 356/350 |

FOREIGN PATENT DOCUMENTS

| | | |
|---|---|---|
| 3109789 | 1/1982 | Fed. Rep. of Germany . |
| 3234078 | 3/1983 | Fed. Rep. of Germany . |
| 3626386 | 2/1987 | Fed. Rep. of Germany . |
| 3708661 | 9/1987 | Fed. Rep. of Germany . |
| 2112202 | 7/1983 | United Kingdom . |

Primary Examiner—Mark O. Budd
Attorney, Agent, or Firm—Spencer & Frank

[57] ABSTRACT

A torsional vibration drive for a laser gyro comprises a hub, spokes and an outer rim, with piezoceramics arranged on the spokes. Bending elements provided at the junction of the spokes and rim ensure high flexibility for rotations of the rim around the axis of rotation of the drive.

3 Claims, 5 Drawing Sheets

TORSIONAL VIBRATION DRIVE

The invention relates to a torsional vibration drive having the features of the preamble of claim 1.

Ring laser gyros are able to measure rotational velocities with great accuracy. It is known, however, that without special countermeasures ring laser gyros are unable to measure very small rotational velocities since the frequencies of the two oppositely rotating lightwaves, which differ due to inertial rotation, are contracted into a common intermediate frequency (pulling effect of coupled oscillators, the so-called lock-in effect). Although it is possible to employ a number of laser gyro specific design criteria in order to influence the magnitude of this dead zone which extends around the zero point of rotational velocity, it remains so large, even with the best possible configuration of the relevant parameters, that the rotational velocity measuring error is unacceptable in almost all practical applications, for example, in position control and, most of all, in navigation systems.

One method employed to avoid this error is known as "dithering". Here, the laser gyro is caused to perform uniform torsional vibrations about an axis perpendicular to the plane of the beam path.

The time during which frequency synchronization occurs at the points where the laser gyro reverses its torsional vibrations, is determined by the maximum amplitude and the frequency of the vibrations and can thus be minimized. The ultimately remaining respective measuring error of the laser gyro is thus reduced significantly. Torsional vibration must not produce any structural deformation of the basic gyro body, such as, for example, periodic expansion, compression or bending, since, due to periodic or non-periodic loss modulation of the optic resonator, this leads to false measuring behavior of the laser gyro.

In prior art torsional vibrators, a small diameter spoke wheel was employed whose hub was fastened to the support system to be measured and whose outer cylindrical rim fits into an opening in the center of the gyro block. The entire gyro block was thus supported by the torsional vibrator and both together then constituted a spring-mass system which was excited at its resonant frequency by a magnetic or piezoelectric drive.

Many different modifications of this basic solution are known. The present invention is based on torsional vibrators which have spokes of uniform cross section, to which piezoceramic plates are applied and which thus constitute multilayer flexural elements. If an electrical voltage is applied, a torque is generated in the spokes resulting in a torque which acts on the wheel rim. Customarily the excitation voltage corresponds to the frequency of the resonant frequency of the system.

It is very difficult to increase the operating frequency of these systems and simultaneously keep the vibration amplitude constant. This is so because of a fundamental characteristic of piezoelectric resonant systems which is that the maximum resonant amplitude of a transducer is inversely proportional to the resonant frequency.

Increases in vibration amplitude at a fixed frequency are limited by the tensile strength of the piezoceramic material which is significantly less than that of the metal spokes to which it is applied. If the piezoceramic member is displaced into a region of low stress, this only reduces its effectiveness as a drive. In the past, these and other factors were obstacles to improvements in the configuration of piezo-driven torsional vibration devices in laser gyros.

The following considerations which preceded the invention restrict the simplicity of design of a torsional vibrator.

1. Normally, the mass of the basic laser body is very large and the space allocated to the vibratory mechanism is very small. This requires the torsional vibrator to be made of a material which has a modulus of elasticity that is comparable to that of steel. Usually, steels are employed which additionally have a low coefficient of expansion.

2. The rotation axis must be kept stable. This requires the torsional vibrator to be extremely stiff about all axes except the axis of rotation which, in turn, necessitates the spokes to be as wide as at all possible parallel to the axis of rotation. And this requires that the axis of the torsional vibrator must coincide with the center of gravity of the gyro block.

3. In order to successfully avoid errors, it is extremely important to regulate the amplitude as well as the frequency of the vibrations. Usually, the vibration generators are operated at mechanical resonance; the resonant frequency is then determined by the torsion spring constant which is difficult to predetermine and cannot be changed substantially once the torsional vibrator has been manufactured. Customarily, the operating amplitude is limited by the surface tensile strength of the piezoceramic material.

4. Deformation of the torsional vibrator during operation must be avoided. Contraction and expansion produce false signals in the laser gyro. This inevitable limitation requires that torque be introduced into the basic gyro body along the circumferential line of a cylinder which is symmetrical to the axis of rotation. The cylinder should have a small diameter and be disposed in the center of the basic gyro body. Application of point forces into the basic gyro body will result in the gyro furnishing unacceptable false measuring results.

5. The finished device must be suitable to be operated over a broader range of ambient temperatures as required by various user specifications.

The vibration generator must be connected with the gyro block by means of a coupling which prevents structural deformation of the gyro block due to thermal expansion in the radial direction.

This coupling may be a simple one, such as, for example, a thick layer of elastic material or it may be complicated, such as, for example, a multi-joint three dimensional flexure element.

In any case, the result is a coupling which is very stiff in the direction of rotation and very yielding in the radial direction. This coupling in fact represents a practical limitation on gyro performance because it reduces off-axis stiffness.

Arrangements according to the prior art which include the above-described limitations are produced of steel having a low coefficient of expansion, such as, for example invar, and are composed of a center post, four or six planar spokes having a uniform rectangular cross section and a cylindrical rim which also has a uniform rectangular cross section.

Piezoceramic plates are attached on the side faces of each spoke and are all charged simultaneously with a high voltage at such a frequency that the system oscillates at its resonant frequency.

U.S. Pat. No. 4,349,183 discloses a torsional vibration drive for a laser gyro in which the stress on the piezoelements is to be reduced. This torsional vibration drive essentially includes a hub, spokes on which piezoelements are applied over the axial expanses of the spokes, as well as a rim. The spokes include a flexural member which is disposed in an insertion opening in the region of the transition between wheel and spokes. Due to this configuration of the torsional vibration drive. The spokes are bent in the shape of the letter S during the vibration process.

In contrast thereto, the present invention proposes a specially constructed piezo-driven torsional vibrator for laser gyros. This torsional vibrator is suitable to be operated at a significantly higher frequency and amplitude.

According to one embodiment of the invention, the torsional vibrator according to the invention is constructed similarly to the prior art torsional vibrators. It is composed of a single steel block having a low coefficient of thermal expansion, has a central hub which is connected, for example, on the carrier vehicle and is provided with spokes and a rim, all having a uniform rectangular cross section.

However, the spokes are fastened to the rim by way of a special flexural element. This flexural element is designed in such a way that it operates like a hinge which is very yielding for flexural motion in a plane perpendicular to the axis of rotation but has great stiffness against flexural motion outside of this plane.

The use of a hinge at the connection between spoke and rim provides a much more effective conversion of the electrical energy to mechanical energy for the piezoelements, less surface stress for the piezo elements and other advantages as well.

Compared to the prior art, the present invention has at least the following four advantages:

1. The use of a hinge simplifies determination of the resonant frequency by avoiding rim deformation of the spoke wheel.

2. The use of a hinge ensures that the entire volume of the piezoceramic member can be utilized to generate torque. Because of the occurrence of moment compensations, the prior art embodiments by far do not reach this this degree of utilization.

3. The use of a hinge reduces the maximum surface stress on the piezoceramic member compared to a solution without hinge if the same frequency and vibration amplitude are assumed.

4. The hinge decouples the rim from the torque at the outer end of the spokes. Thus the usual deformation of the rim is avoided which would either be transferred to the gyro block or would cause valuable vibration energy to be dissipated into the connection between rim and basic gyro body. The result is that greater mechanical quality can be realized.

Embodiments will be described with reference to the drawing figures.

FIG. 1 is a plan view of an embodiment of a torsional vibrator according to the invention.

Figure 1:
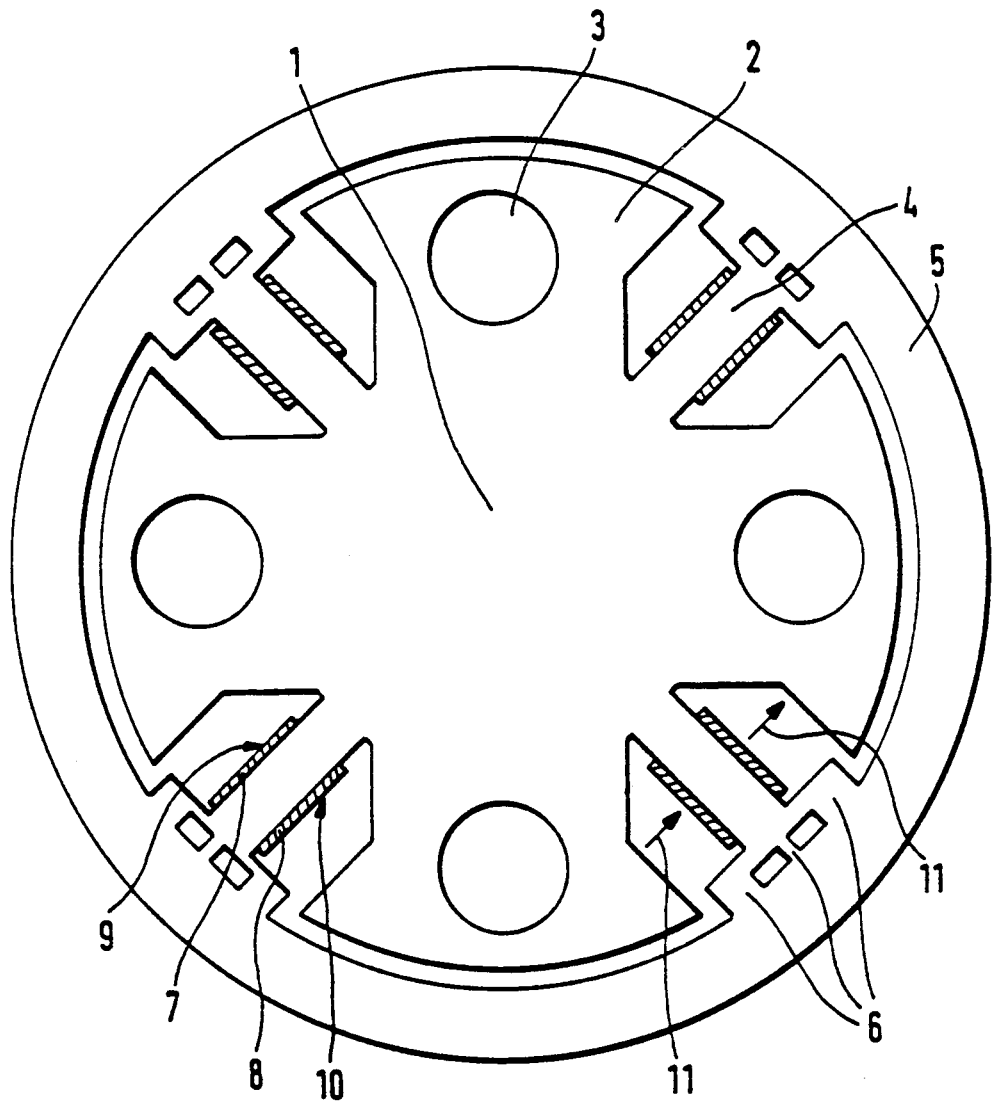
FIG. 1 is a plan view of a torsional vibrator according to the invention.

This torsional vibrator is worked out of a workpiece composed of a steel having a low coefficient of expansion. A hub 1 is held by four projections 2 which are fixed at a fastening plate (not shown) by means of four pins (not shown) that were pushed through bores 3. Four spokes 4 are provided which extend outwardly from hub 1 and are connected with a cylindrical rim 5 by way of special hinges 6. A laser gyro block (not shown) includes a central fastening opening into which rim 5 is fitted. This connection constitutes the only mount for the laser gyro block. This piezoceramic plates 7 and 8 provided with electrodes at their large surfaces are conductively applied on both sides of each spoke 4 in form-locking contact over their entire surface.

The plates have such dimensions that they cover the major portion of the spoke surface. The outer electrodes 9 and 10 of plates 7 and 8 are all electrically connected with one terminal of an alternating voltage source (not shown). The other terminal of the source is connected with the body of the torsional vibrator. The piezoceramic plates all have remanent polarization vectors 11 which are oriented counterclockwise in FIG. 1. Then the application of a positive potential to the outer electrodes of the piezoceramic plates generates a clockwise moment on rim 5.

The torsional vibrator may be composed of invar or a similar alloy and has a diameter of about 5.5 cm and a high (thickness) of about 3 cm. Preferably, four spokes 4 are provided which have a width (dimension between plates 7 and 8) of a few millimeters and radial lengths of about 10 or more millimeters.

In the remaining area, hub 1 is made as stable as possible in order to be able to avoid flexure contributions by the hub.

Figure 2:
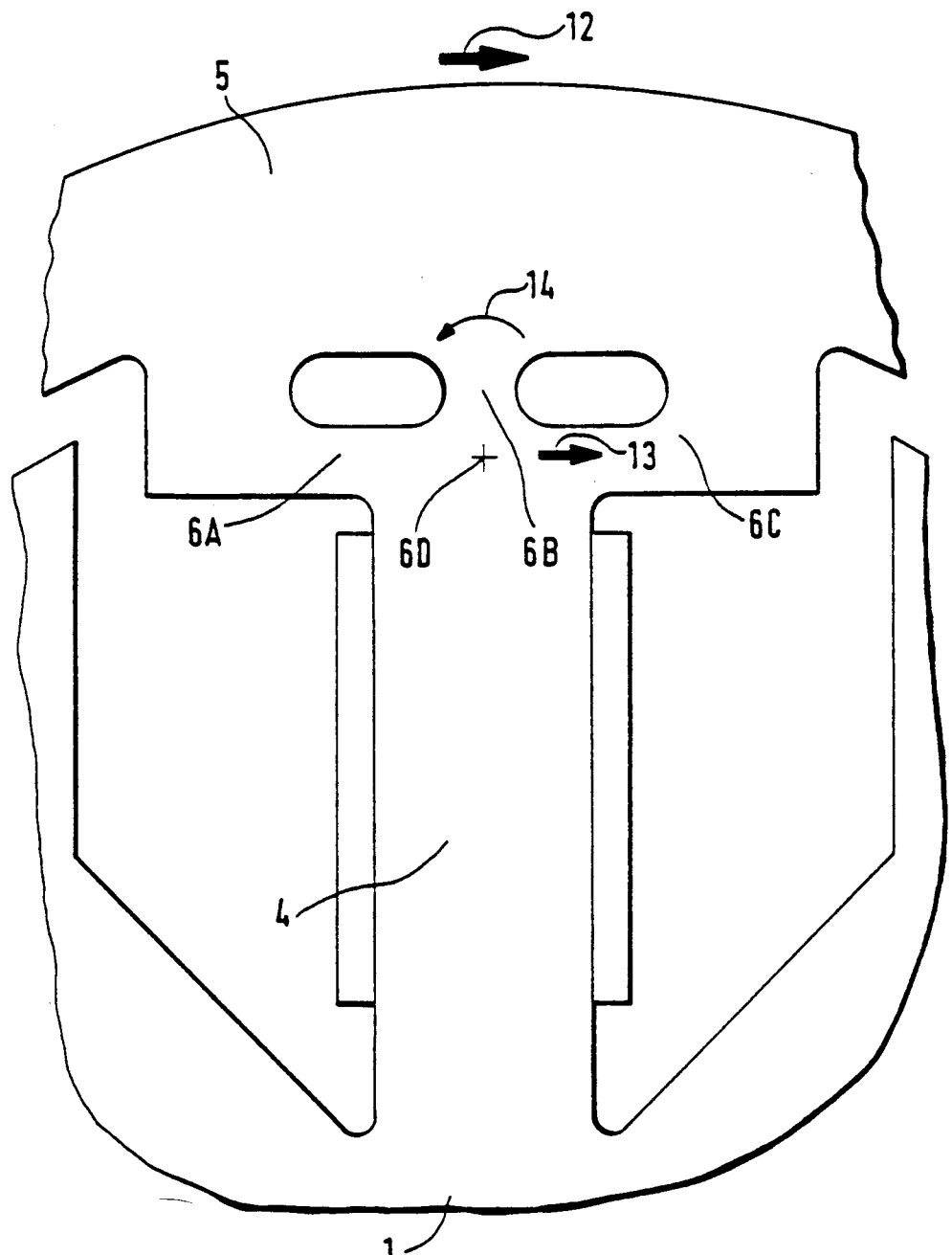
FIG. 2 is a detail view of the connection in FIG. 1.

An enlarged view of a spoke 4 and a hinge 6 is shown in FIG. 2. The height of the hinge is preferably as great as that of the entire torsional vibrator (about 3 cm).

If rim 5 is turned in the direction of arrow 12, a translational force 13 as well as a torque 14 acts on the end of spoke 4 at 6D.

The hinge is configured in such a way that under the occurring forces segments 6A, 6B and 6C together form a resilient torsion spring about point 6D and thus decouple moment 14 form the end of the spoke.

On the other hand, however, segments 6A and 6C are very stiff with respect to a compression or tension in the direction of translational force 13. The result is that indeed the full translational force 13 reaches the end 6D of the spoke. As a result, the spoke acts almost as a free beam that is clamped to the hub only on one side and is subjected to a point load at its tip. The flexural element 6B is resistant to pressure also in the radial direction so that undesirable transverse vibrations are avoided which would otherwise occur.

Since elements 6A, 6B and 6C have the same height (thickness) as the torsional vibrator, they are highly resistant to torsion for forces that act around axes which do not coincide with the desired gyro rotation axis. The thickness and length of elements 6A, 6B and 6C lie in an order of magnitude of 1 mm.

It can be shown that for torsional vibrators configured according to the invention, in which thus the spokes can be considered as supports emanating form the hub and free at their other ends, the dimensions of the spokes constitute by far the most significant parameters for a determination of the mechanical resonant frequency of the laser gyro arrangement.

In the past, the dimensions of the rim and the connection between rim and block were of equal significance so that a prediction of the mechanical resonant frequency was very difficult. The contribution of the hinges employed according to the invention to the determination of the frequency, however, is less than 10%.

Figure 3A:
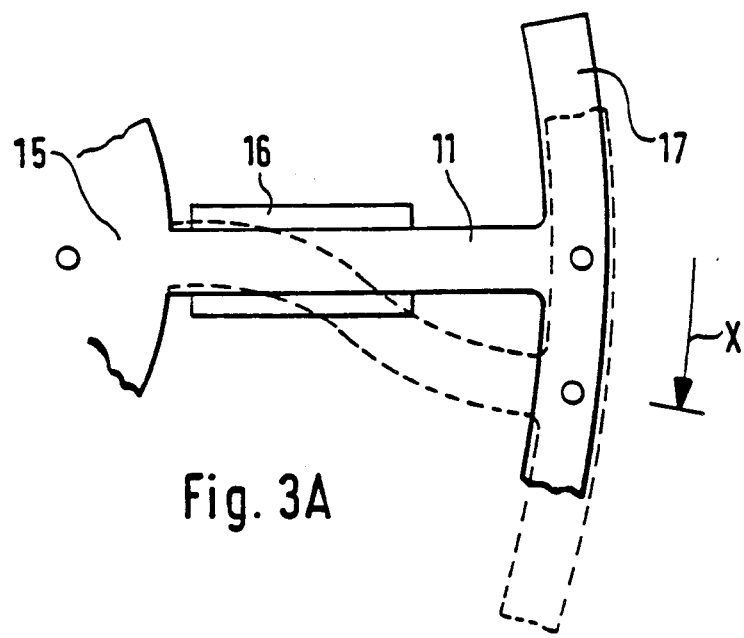
FIGS. 3A and 3B show spoke connections without and with, respectively, the special hinge according to the invention.

FIG. 3A shows a prior art spoke 11 which starts at hub 15 and is here rigidly connected with rim 17. If rim 17 is twisted about an angle x, the bent spoke will have the shape shown in dashed lines. The spoke exhibits a characteristic double bend, that is, it has the shape of the letter S.

Figure 3B:
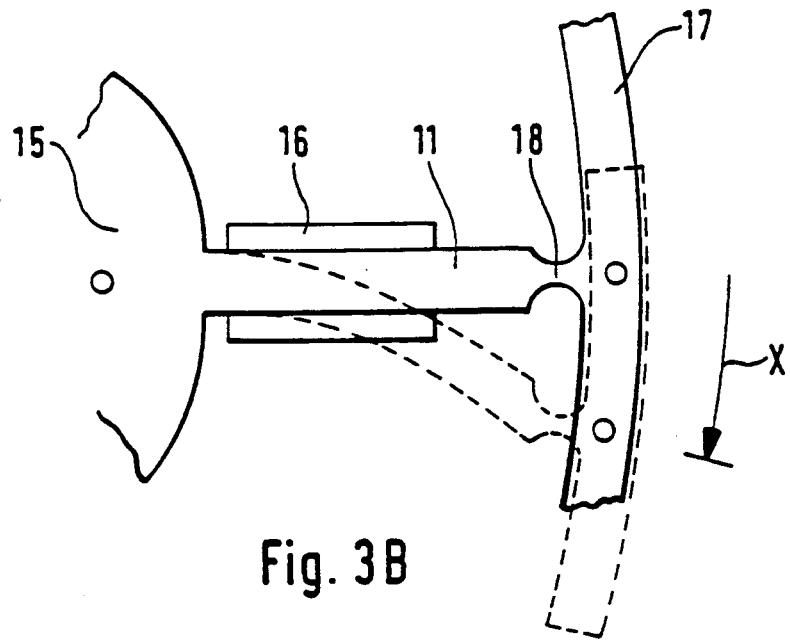

FIG. 3B shows a similar spoke 11 which is connected with rim 17 by way of a flexural joint 18. If rim 17 is twisted about the same angle x, the spoke 11 of this embodiment is subjected to a less severe bend; this results in a significantly lower surface stress on piezoelements 16. It has been found that even if the spokes according to FIGS. 3A and 3B have the same stiffness, the advantage of the configuration of FIG. 3B remains in effect, that is, the surface tension of the ceramic material is no limitation with respect to the attainable amplitude.

Conventional simple torsional vibrators employing spokes are also disadvantageous because they do not efficiently utilize the mechanical energy generated by the piezoelements. This will be described with reference to FIGS. 4A and 4B which illustrate a simple experiment that can be performed with the use of bimorphous plates.

Figure 4A:
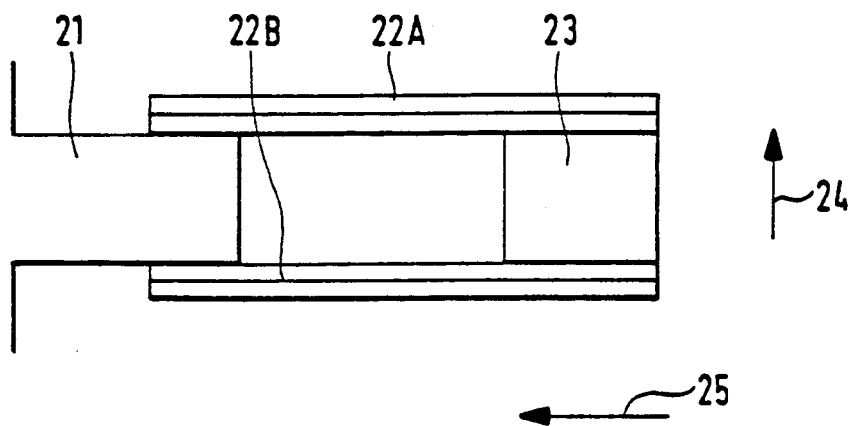
FIGS. 4A and 4B are schematic representations of an experiment which shows clearly in what way the present invention permits greater utilization of the mechanical energy made available by the flexural elements.

FIG. 4A shows flexural members 22A and 22B which are intended to represent two adjacent spokes of a torsional vibrator and are fastened to a basic body 21 corresponding to the hub and to a rigid block 23 corresponding to the rim.

When flexural member 22B is excited so that its right end is moved in the direction of arrow 24, flexural member 22A, which is stressed with pressure in the manner of a passive column and acts as lever by way of block 23, generates a torque at the tip of flexural member 22B to almost entirely counteract the torque generated by the piezoelements. Due to the existing symmetry, the same result may be expected if flexural member 22A is excited.

Figure 4B:
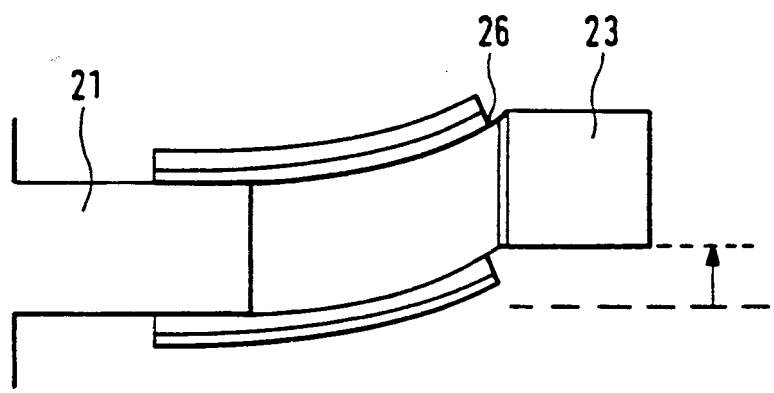

In practice, a result is obtained in which the expected static deflection is reduced to a considerable degree as a result of the losses of mechanical energy. In FIG. 4B, however, hinges 26 representing the flexural members of the present invention decouple the rotational activities of flexural members 22A and 22B from the translational activity so that it becomes possible to derive almost the entire realizable work from the flexural members.

In torsional vibration arrangements according to the prior art the reduction in moments is not a s great as in the experiment described in connection with FIG. 4A because parts of the spokes and/or parts of the rim still sometimes act as flexural members; nevertheless, very little of the existing mechanical energy is utilized and is dependent on tolerances in the placement of the piezoceramic elements and the manner of fastening the gyro block to the torsional vibrator.

Figure 5A:
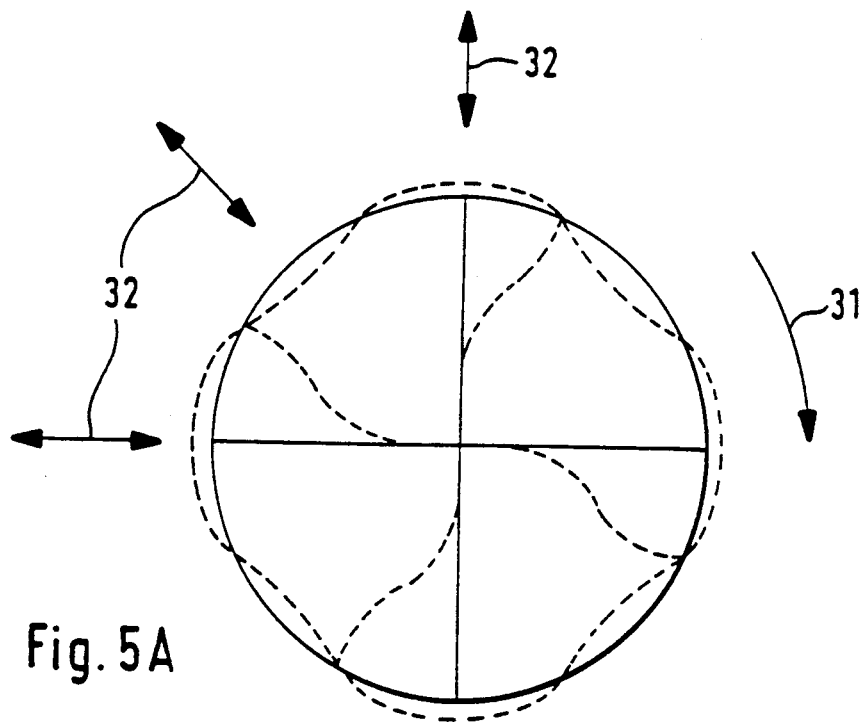
FIGS. 5A and 5B show spoke and rim bending typical for the prior art and for the present invention.

FIG. 5A is a schematic representation of the bending pattern of a torsional vibrator whose spokes are rigidly connected with the rim and which wa twisted in the direction of arrow 31. The resulting movements of parts of the rim in radial directions 32 cause difficulties in fastening the gyro block to the torsional vibrator.

If the connection is rigid and uniform, oscillating deformations are transferred to the gyro block.

Figure 5B:
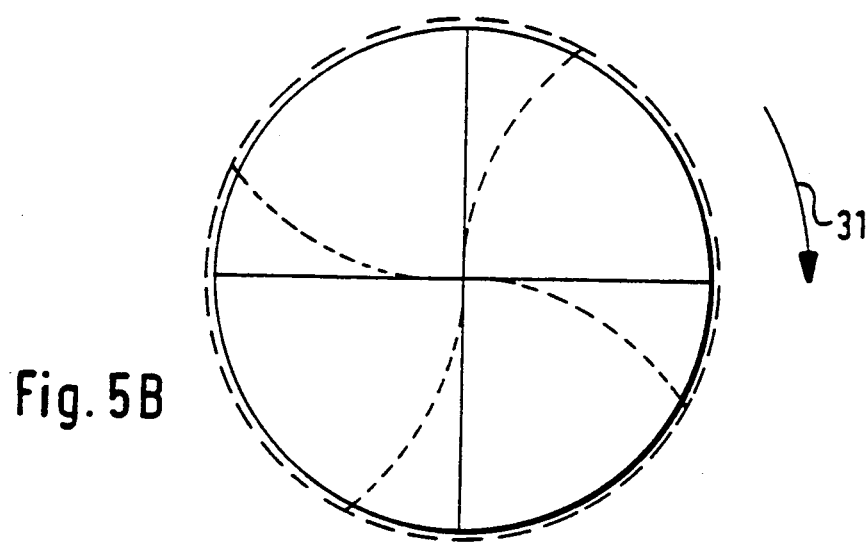

If, however, the connection is soft, uncontrollable damping occurs and an undesirable offaxis compliance is introduced into the device. FIG. 5B shows the bending pattern of a torsional vibrator which exhibits flexural deformations that are influenced by hinges. In this case, the above demonstrated difficulties in connection with the fastening of the rim to the gyro block will not arise.

I claim:

1. A torsional vibration drive for a laser gyro comprising a hub which is fastened to a base plate and is connected with a rim by way of a plurality of radial spokes, with the rim being connected with the laser gyro and holding the center of gravity of the laser gyro on the axis of the torsional vibration drive (rotation axis), the drive further comprising plates of a piezoelectric material which are applied to the lateral faces of the spokes and electrodes thereabove so as to cause the rim to perform oscillating vibrations about the axis of rotation when an alternating voltage is applied, with a flexural member being formed in each region of the transition from a spoke (4; 11) to the rim (5; 13), there is formed a flexural member (6; 15) which exhibits great flexibility for rotation of the rim about the axis of rotation, characterized in that the flexural member (6) is formed of a radially extending web (6B) and two webs (6A and 6C) which correspond to one another in the tangential direction.

2. A torsional vibration drive according to claim 1, characterized in that the height of the torsional vibration drive is selected to be as great as possible.

3. A torsional vibration drive according to claim 2, characterized in that the height of the flexural member (6; 15) is also approximately the same as the height of the entire drive.

* * * * *